Patented July 11, 1933

1,917,283

UNITED STATES PATENT OFFICE

JOHN F. WROTEN, OF BALTIMORE, MARYLAND

PROCESS FOR MANUFACTURING YEAST

No Drawing.  Application filed March 19, 1930. Serial No. 437,281.

My invention relates to a process of manufacturing yeast and more particularly it relates to a process of making baker's yeast which process results in high yields of yeast of excellent quality.

One object of my invention is to provide for the manufacturing of yeast which is expeditious to use and which is relatively inexpensive both as to raw materials involved and the manipulation employed.

A further object is to provide a process of producing baker's or compressed yeast which will result in high yields of good quality yeast both from the standpoint of baking strength and keeping qualities.

Still another object is to provide a process of manufacturing baker's yeast in which a relatively large portion of nitrogenous nutriment is furnished to the yeast by inorganic ammoniacal salts such as ammonium phosphate or ammonium sulphate or both but which process, due to a co-operation between the raw materials used and the various steps employed, does not require any neutralization or other means of counteracting deleterious acid, which has heretofore been considered necessary when satisfactory yields of yeast are obtained.

A further object is to provide a method of manufacturing yeast characterized by the substantial absence of alcohol in the spent mash at the end of the yeast propagating period without the necessity of employing a substantially constant addition of nutriment which has heretofore been considered necessary when substantial absence of alcohol is desired.

Other objects will be apparent from a consideration of the specification and claims.

Heretofore, in yeast mashes containing relatively large amounts of ammoniacal inorganic salts, the workers in the art have considered it necessary to provide for the counteraction of the inorganic acids set free as the yeast cells consumed the nitrogen from the ammoniacal portion of the salts during growth. Various antacids or neutralizing agents have been suggested and employed. The yeast maker determined when the neutralizing agent should be added by determining the acidity at frequent intervals and adding the antacid when the acidity reached, or was found to be higher than, a certain figure. This required the operator to watch his mash constantly and to titrate the mash frequently. Besides, the constant supervision required, and the possible errors in the unskilled workman's titration figures, the use of the neutralizing agents represented an additional cost of raw materials.

When large proportions of yeast nourishing inorganic salts, particularly ammoniacal salts have been present in the wort, it has been recommended that dilution be employed to counteract what has heretofore been referred to as the harmful salt effect. This use of the dilution means that large volumes of liquid must be handled and hence besides the trouble of such handling, the power, heat, and air compressor costs have been great.

Furthermore, in carrying out yeast processes in which it is desired to have very little or no alcohol remaining in the spent mash and to have correspondingly high yields of yeast of above 70% on the raw materials used, the operators have deemed it necessary to add substantially continually throughout the greater portion of the period of yeast growth, a wort, more concentrated than the wort in the fermenter and at an increasing rate so that the concentration in the fermenter remained substantially constant throughout the propagating period. This procedure also involved supervision and care in the maintenance of the correct rate of feed as well as the determination of gravity readings throughout the run.

The process of my invention is characterized by the employment of a series of propagating steps in each of which the propagation is carried on until substantially all of the sugar has been assimilated by the yeast. As is shown hereinafter in the specific example, 230 pounds of original seed yeast are increased to 520 pounds of yeast at the end of the first step; then this 520 pounds in turn produces 1250 pounds at the end of the second step which in turn increases to more than 2300 pounds at the end of the third step. The amount of sugar added to the fermenter in each step is less in weight than the weight of the yeast therein and is sufficient in amount to continue propagation for a relatively long period of time. The addition of each wort to the fermenter is made in as short a time as is practicable, and feeding of the wort over any appreciable length of time is avoided. It is to be noted that in accordance with the invention, there are no withdrawals of either yeast or wort from the fermenter during the entire process; in other words, at the same time of any addition, the fermenter will contain all of the previously added wort and the yeast produced therefrom.

The process of my invention is also characterized by simplicity in that no neutralization or high dilution is required and no substantially constant feeding of the more concentrated wort at the increasing rate is necessary. The process obviates the necessity of constant supervision, determination of the acidity or gravity readings throughout the run, and the handling of large volumes of liquid. The yields of yeast obtained are as high as those previously obtained by the complicated process and no alcohol is found in the spent mash. The quality of the yeast is excellent. The keeping qualities and baking strength of the yeast are as good if not better than those obtained following prior processes.

The process of the present invention, due to a definite relation between the amount of seed yeast and the amount of sugar weight for weight present at the start of propagation and the initial concentration of the nutrient solution, results in a process in which the sugar is assimilated by the yeast to form cell structure and bring about the growth of yeast at the same time producing little or no alcohol. Furthermore, in the process no neutralization is required even though inorganic ammoniacal salts are employed to furnish nitrogen to the yeast and even though these salts are present in very substantial quantities. According to the present invention, at the start of propagation, the seed yeast is equal to or greater than the sugar material present weight for weight and the concentration of the solution is so adjusted that assimilation of the sugar by the yeast to form cell structure and bring about yeast growth is assured. This assimilation of the sugar in the production of yeast prevents the formation of any substantial quantities of alcohol. What little alcohol is formed is for the greatest part consumed by the large amount of yeast that is present. This relationship between the amount of seed yeast relative to the sugar and the use of the concentration which favors assimilation results in what may be called "a mass action phenomenon". Since under the conditions described, the propagating action of the yeast is accelerated due to the high ratio of the yeast to the sugar nutriment and the close contact between the yeast and the sugar brought about by the concentration of the solution, optimum conditions are afforded for the assimilation of the sugar by the yeast cells to form cell structure and bring about the growth of yeast. The nutriment material is in more intimate contact with a relatively large amount of yeast cells and it is this relation which causes the quick growth of the yeast and the formation of good quality cell structure at the expense of the formation of alcohol.

Preferably in carrying out the process of this invention, the propagating period is divided into two or more propagating steps which may be considered to be fairly independent yeast propagating processes. A definite quantity of seed yeast is placed in the fermenter with a portion of the total wort which has been prepared, the amount of seed yeast added being in excess of the amount of sugar in the fermenter weight for weight. The concentration of the wort is also chosen as indicated above so that optimum conditions favoring yeast growth are assured. This portion placed in the fermenter may occupy the entire fermenter volume or any desired proportion of the total volume of the fermenter, for example from 20% to 30%. The yeast growth is continued until substantially all the sugar has been assimilated by the yeast and if the total fermenter volume was not employed then a second portion is added in such an amount that the sugar there contained will be less than the total weight of yeast in the fermenter including the seed yeast originally added and the yeast produced by the first propagating step. The concentration of the wort added is so adjusted that the resulting concentration in the fermenter will be the optimum for yeast growth under the conditions of the process. This amount added may equal the total volume of the fermenter if conditions are so chosen that the sugar added bears the stated relationship to the amount of yeast in the fermenter, or the amount added may only partially fill the fermenter, making a total wort in the fermenter of from 35% to 60%, for example. If the fermenter has not been filled by the addition of the second portion, the propagation is continued until substantially all the sugar in the fermenter has been assimilated by the yeast and then another portion is added which may or may not fill the fermenter as desired. This process is carried on until the total volume of the fermenter has been made up. With the addition of each step, the amount of sugar added in the wort bears the stated relationship to the amount of yeast in the fermenter, that is to say there is less sugar added weight for weight than the amount of yeast in the fermenter, and the concentration and amount of the wort added bears such a relationship to the wort in the fermenter that the resulting concentration is the optimum for the yeast growth. Generally, it will be found that the optimum concentration for yeast growth is between 2.5° Balling and 4° Balling, though these limits may be varied under various circumstances.

By the preferred propagation in portions as outlined immediately above, the volume in the fermenter for a large part of the yeast propagating period is less than the total volume of the fermenter. The use of the small volume and the adding of subsequent portions result in considerable saving in power, heat, and air compressor costs, and is, therefore, a particularly advantageous method of carrying out the present process. Since in each separate propagation period, the propagation is carried on until the wort has been substantially exhausted of sugar, the time existing between additions will be of considerable length and in commercial practice generally, the additions will not be made oftener than every three hours for such period of time at least is usually required to exhaust the sugar for cell structure and yeast growth.

The presence of the large amounts of yeast relative to the sugar and use of concentration which favors yeast growth under these circumstances allow the process to be carried out using large amounts of inorganic yeast nourishing salts, particularly ammoniacal salts. The ammoniacal salts are added preferably at the start and the amount may be as great as the amount of sugar added initially to the fermenter. In the specific example hereinafter referred to, the amount of salts added is about 72% of the sugar added. This amount may be varied and in no case have any difficulties been encountered either due to the supposedly harmful effect of the salts themselves or the supposedly harmful effect of the acids liberated from the salts during yeast growth.

According to the present process, the sugar-furnishing materials may be grain, or molasses, or a combination of both. If grain is employed either wholly or in part, it is saccharified in the usual manner. For example, the corn or malt is ground and the sprouts are added to the mash tub containing the ground material. The mash is heated to the saccharification temperature and maintained at that temperature until the diastase of the malt has acted upon the starch to convert it into sugar. A large portion of the nitrogen required for yeast growth in the present process is furnished by inorganic salts such as ammonium phosphate or ammonium sulphate or both.

In those mashes in which the saccharified grain is a constituent, the peptonization is carried out by the addition of phosphoric acid in place of the lactic acid usually used. The use of phosphoric acid has proved to give excellent results and does not give rise to harmful acids during the period of propagation. In the carrying out of my process, the mash in all cases is thoroughly aerated during the yeast propagation.

In a typical case, 450 pounds of malt and 500 pounds of sprouts are saccharified in any suitable manner such as that indicated above. After saccharification, 20 pounds of 50% phosphoric acid are added to the mash for the purpose of peptonization. The mash is heated to a sufficiently high temperature to cause sterilization and peptonization. After this process is completed, the mash is cooled and filtered. The resulting acidity of the mash is approximately 10 cc., that is to say 10 cc. of $\frac{1}{10}$ normal caustic soda solution are required to neutralize 50 cc. of the mash using litmus as an indicator. This scale will be used throughout the specification and it is to be understood that when acidity figures are given as so many cubic centimeters, this scale of acidity is used. 6 pounds of aqua ammonia are added to this mash, thereby forming monoammonium phosphate in the mash, bringing the acidity down to approximately 5 cc. 2000 pounds of molasses are diluted with water in the ratio of two parts of water to one part of molasses. Approximately 16 pounds of sulphuric acid (or equivalent amounts of phosphoric acid) are added for the purposes of sterilization and acidification and the mass is heated to approximately 80° C. The resulting acidity of the molasses is from 5 to 8 cc. The grain and molasses mashes are then combined by simple mixing. The resulting acidity is from 5 to 8 cc. and the Balling is about 14°.

Approximately 14% (240 gallons) of the combined mashes is added to the fermenter and the initial Balling is brought down to approximately 2.5° by the addition of water. 125 pounds of diammonium phosphate are added to the mash, bringing the Balling to 3.3°. The volume of the mash is approximately 1700 gallons. The mash, if it is not already at the propagating temperature, is brought to approximately 29° C. and 230 pounds of seed yeast are added. The air is turned on and the mash thoroughly aerated throughout the propagating periods.

The propagation is continued for four hours, at which time the Balling is 2.2° and the acidity approximately 3 cc. At the end of four hours, 590 gallons of the combined ports and approximately 1580 gallons of water are added preferably at the same time. No attempt is made to extend this addition to the fermenter over any considerable period of time. In the equipment available, all the water and mash are added in ten or twelve minutes. Following this addition, the Balling is 3.5° and the acidity approximately 3 cc.

The propagation then continues without further addition or changes for another five hours, at which time the Balling is 2.5° and the acidity is between 5 cc. and 8 cc. At the end of this second period, the rest of the wort is added to the fermenter in the same manner as the first addition, that is the wort and water are added as quickly as is feasible, say in about fifteen minutes. The wort added amounts to 855 gallons while the water amounts to 2225 gallons. After the addition of the water and wort, the Balling is 3.3° while the acidity is from 5 cc. to 8 cc. The propagation is continued until the mash is exhausted—generally six hours after the last addition. No further additions or changes are made in the process. The Balling at the end of the run is 2.4° and the acidity is 3 cc. to 5 cc. The yield obtained is very high, being comparable with the yields obtained by the most improved processes heretofore used, and the yeast is of excellent quality. Very little or no alcohol is found in the spent mash.

Calculations and determinations based on the above example show that at the start of propagation, there are 230 pounds of seed yeast added to a wort containing approximately 175 pounds of sugar, the concentration of the wort being 3.3°. The volume of the wort at the start is 25% of the total fermenter volume which is in this particular case 7000 gallons. After four hours, a wort containing approximately 432 pounds of sugar is added to the fermenter which at that time contains approximately 520 pounds of yeast. The resulting Balling of the wort in the fermenter after the addition is 3.5°. The volume of the wort after this addition is 56% of the total fermenter volume. At the end of nine hours, approximately 645 pounds of sugar are added to the fermenter which at that time contains approximately 1250 pounds of yeast. The resulting Balling after the addition of the wort is 3.3°, and the total fermenter volume of 7000 gallons has been made up. The fermentation is continued for six hours, at the end of which time there is present in the fermenter approximately 2300 pounds of yeast. The Balling figures given for the second and third steps include the yeast but the yeast only represents in the second step an increased reading of .4° while in the third step an increased reading of .7° at a maximum. It will be therefore seen that in all cases the Balling reading based on the raw materials alone is approximately 2.5° or above.

In the typical example, I have described a process in which a portion of the phosphoric acid is formed into mono-ammonium phosphate after peptonization. This, however, is not necessary, but since the resulting monoammonium phosphate furnishes nitrogen as well as phosphorus to the yeast, it is an expedient method of adding nitrogen to the mash. Even if the monoammonium phosphate is not formed, no slackening of the growth of yeast is encountered during propagation, the phosphoric acid not exerting any harmful effect on the yeast. If desired, diammonium phosphate may be formed in place of the monoammonium phosphate, but if this is done, the resulting mash should still have an acid reaction. There is also described in the example the addition of diammonium phosphate at the start of the propagation. A portion or all of this diammonium phosphate may be replaced by equivalent amounts of ammonium sulphate or other inorganic ammoniacal salts, if desired, and, furthermore, the phosphate added may be monoammonium phosphate instead of the diammonium phosphate. The salts may be periodically added during the propagating period, for example with the reserve portions of the wort, but since no advantage is obtained by such periodic addition, it will be desirable to add the salts at the start as given. Furthermore, the molasses can be acidified with phosphoric acid, if desired, rather than with sulphuric acid, or the unacidified molasses may be added to the acidified (phosphoric acid) grain mash having sufficient acidity to bring about acidification of the molasses, leaving the combined wort acid.

In the example, two additions of wort are made at the end of four hours and nine hours respectively. The time of addition and the number of additions may be varied. For instance, four additions may be made at intervals three hours apart. As pointed out in the example, the additions are made as quickly as possible. With the equipment normally used, the additions do not require more than ten to fifteen minutes.

It will be understood that the amounts of materials, the Balling and acidity at the start, and the amounts of materials and Balling at various points in the run may be varied to suit particular conditions, provided that the various factors are so adjusted that the amount of seed yeast is equal to or greater than the amount of sugar present and the Balling of the propagating solution is such as to cause the assimilation of the sugar by the yeast to form cell structure and bring about yeast growth as opposed to the production of alcohol. The acidity figures given in the specific example will also vary from time to time. Furthermore, the mash may be an all-grain mash or an all-molasses mash without departing from the essential features of the invention, the procedure being modified only so far as the use of these materials separately require it.

I claim:

1. The manufacturing of yeast which comprises placing in a fermenter a dilute yeast nutrient solution of an amount which does not fill up the fermenter, said nutrient solution containing sacchariferous material and other yeast nutrients, adding seed yeast to the solution in amounts at least equal to the weight of the sugar in the nutrient solution, aerating the solution, allow the yeast to propagate until substantially all the sugar has been assimilated by the yeast, adding a second wort containing at least sacchariferous material to the fermenter containing all of the first wort and the yeast produced therefrom, the addition of the total of said second wort being made in a relatively short period of time, said second wort containing less sugar in weight than the weight of the yeast in the fermenter and sufficient in amount to continue propagation for a relatively long period of time, and thereafter allowing the yeast to propagate with aeration until substantially all the sugar added in the second wort has been assimilated.

2. The manufacturing of yeast which comprises placing in a fermenter a yeast nutrient solution of an amount which does not fill up the fermenter, said nutrient solution containing sacchariferous material and other yeast nutrients and having a Balling of more than 2° on the saccharometer, adding seed yeast to the solution in amounts at least equal to the weight of the sugar in the nutrient solution, aerating the solution, allowing the yeast to propagate until substantially all the sugar has been assimilated, adding a second wort containing at least sacchariferous material to the fermenter containing all the first wort and the yeast produced therefrom, said second wort containing less sugar in weight than the weight of yeast in the fermenter and of such concentration that the resulting Balling in the fermenter after the addition will be more than 2° on the saccharometer, the addition of the total of said second wort being made in a relatively short period of time, and thereafter allowing the yeast to propagate with aeration until substantially all the sugar added in the second wort has been assimilated.

3. The manufacturing of yeast which comprises placing in a fermenter a dilute yeast nutrient solution of an amount which does not fill up the fermenter, said nutrient solution containing sacchariferous material and other yeast nutrients, adding seed yeast to the solution in amounts at least equal to the weight of the sugar in the nutrient solution in the fermenter, aerating the solution, allowing the yeast to propagate until substantially all the sugar in the fermenter has been assimilated by the yeast, adding in successive steps at least two worts each containing at least sacchariferous material to the fermenter containing all of the previously added wort and the yeast produced therefrom, each additional wort being such that the weight of the yeast in the fermenter exceeds the weight of the sugar added and containing sugar in amounts sufficient to continue propagation for a relatively long period of time, the addition of the total of each of the added worts being made in a relatively short period of time, and after each addition allowing the yeast to propagate with aeration until substantially all the sugar has been assimilated prior to the addition of another wort.

4. The manufacturing of yeast which comprises placing in a fermenter a yeast nutrient solution of an amount which does not fill up the fermenter, said nutrient solution containing sacchariferous material and other yeast nutrients and having a Balling of more than 2° on the saccharometer, adding seed yeast to the solution in amounts at least equal to the weight of the sugar in the fermenter, aerating the solution, allowing the yeast to propagate until substantially all the sugar in the fermenter has been assimilated by the yeast, adding in successive steps at least two worts each containing at least sacchariferous material to the fermenter containing all of the previously added wort and the yeast produced therefrom, each additional wort being such that the weight of the yeast in the fermenter exceeds the weight of the sugar added and the resulting concentration in the fermenter will be more than 2° Balling, the addition of the total of each of the added worts being made in a relatively short period of time, and after each addition allowing the yeast to propagate until substantially all the sugar has been assimilated prior to the addition of another wort.

5. The manufacturing of yeast which comprises preparing a yeast nutrient solution containing sacchariferous material and other yeast nutrients, placing a portion of the solution in the fermenter, adjusting the Balling of the solution so that the solution in the fermenter has a Balling of at least 2½° on the saccharometer, adding seed yeast to the solution in amounts at least equal to the weight of the sugar in the fermenter, aerating the solution, allowing the yeast to propagate until substantially all the sugar in the fermenter has been assimilated by the yeast, adding a second portion of the prepared wort to the fermenter containing all of the first wort and the yeast produced therefrom, the total of said second portion being added in a relatively short period of time and insufficient in amount to fill the fermenter and in an amount and concentration such that the resulting Balling in the fermenter will be at least 2½° on the saccharometer and the weight of the sugar added will be less than the amount of yeast in the fermenter, allowing the yeast to propagate with aeration until substantially all the sugar material has been assimilated by the yeast, adding to the fermenter containing all the previously added wort and the yeast produced therefrom sufficient wort required to fill the fermenter the amount and concentration of which is such that the resulting Balling of the solution in the fermenter is at least 2½° on the saccharometer and the amount of sugar added is less than the amount of yeast in the fermenter, the addition of the total of said wort being made in a relatively short period of time, and thereafter allowing the yeast to propagate with aeration until substantially all the sugar has been assimilated by the yeast.

6. The manufacturing of yeast which comprises preparing a yeast nutrient solution containing sacchariferous material and other yeast nutrients, placing a portion of the solution in the fermenter amounting to between 20% and 30% of the total fermenter volume, adjusting the Balling of the solution so that the solution in the fermenter has a Balling of between 2½° and 4° on the saccharometer, adding seed yeast to the solution in amounts at least equal to the sugar in the fermenter, aerating the solution and allowing the yeast to propagate until substantially all the sugar in the fermenter has been assimilated by the yeast, adding a portion of the wort to the fermenter containing all the first wort and the yeast produced therefrom which will fill the fermenter from 35% to 60% of the fermenter volume and of such concentration and amount that the resulting Balling of the fermenter will be 2½° and 4° on the saccharometer and the weight of the sugar added will be less than the amount of yeast in the fermenter, the addition of the total of said portion being made in a relatively short period of time, allowing the yeast to propagate with aeration until substantially all the sugar material has been assimilated by the yeast, adding another portion of the wort to the fermenter containing all of the previously added wort and the yeast produced therefrom to make up the fermenter volume, the addition of the total of said wort being made in a relatively short period of time and of such a concentration and amount that the resulting Balling of the solution will be between 2½° and 4° on the saccharometer and the amount of sugar in the fermenter will be less than the amount of yeast present, and thereafter allowing the yeast to propagate with aeration until substantially all the sugar material has been assimilated by the yeast.

7. The manufacturing of yeast which comprises preparing a wort containing sacchariferous material and other yeast nutrients, placing in the fermenter a portion of the wort amounting to approximately 25% of the fermenter volume, the Balling of the solution being approximately 3° on the saccharometer, adding seed yeast to the fermenter in an approximate ratio of 1.3 parts of yeast by weight to 1 part of sugar in the fermenter, aerating the solution, allowing the yeast to propagate for approximately four hours, adding a fresh portion of the wort to the fermenter containing all the first wort and the yeast produced therefrom which addition is made in a relatively short time and brings the total volume in the fermenter up to approximately 56% of the fermenter volumn, said additional portion of the wort being of such concentration that the resulting concentration in the fermenter will be approximately 3° on the saccharometer and the amount of yeast in the fermenter will be in an approximate ratio of 1.2 parts of yeast to 1 part of sugar added, allowing the yeast to propagate with aeration for a period of approximately five hours, adding to the fermenter containing all of the previously added wort and the yeast produced therefrom sufficient of the prepared wort to make up the fermenter volume, the addition of said wort being made in a relatively short period of time, the reserve wort being of such concentration that the resulting concentration in the fermenter will be approximately 3° Balling and the amount of yeast in the fermenter will be in an approximate ratio of 1.9 parts of yeast to 1 part of sugar added, and thereafter allowing the yeast to propagate with aeration until substantially all the sugar has been assimilated by the yeast.

8. The manufacturing of yeast from sacchariferous material and yeast nourishing inorganic ammoniacal salts which comprises preparing a nutrient solution containing sacchariferous material and an amount of inorganic ammoniacal salts from 50% to 100% of the weight of the sugar in the solution and having a Balling of more than 2° on the saccharometer, adding seed yeast to the solution in amounts at least equal to the weight of the sugar in the solution, aerating the mash, allowing the yeast to propagate until substantially all the sugar in the fermenter has been assimilated by the yeast, adding a fresh supply of wort to the fermenter containing all the first wort and the yeast produced therefrom in an amount such that the weight of the yeast in the fermenter is at least equal to the weight of the sugar added and the resulting concentration will be more than 2° Balling, the addition of the total of the fresh wort being made in a relatively short period of time, aerating the solution and allowing the yeast to propagate until substantially all the sugar in the fermenter has been assimilated by the yeast.

9. The manufacturing of yeast from sacchariferous material and yeast nourishing inorganic ammoniacal salts which comprises placing in a fermenter a yeast nutrient solution of an amount which does not fill up the fermenter, said nutrient solution containing icchariferous material and inorganic ammoniacal salts, said salts being present from 50% to 100% of the weight of the sugar in the solution and said nutrient solution having a Balling so that the solution in the fermenter will be more than 2° on the saccharometer, adding seed yeast to the solution in amounts at least equal to the sugar in the fermenter, aerating the solution, allowing the yeast to propagate in the fermenter until substantially all the sugar in the fermenter has been assimilated by the yeast, adding in successive steps at least two fresh supplies of wort to the fermenter containing all the previously added wort and the yeast produced therefrom, each addition being such that the weight of the yeast in the fermenter exceeds the sugar added and the resulting concentration in the fermenter will be more than 2° Balling, the addition of the total of each of the added worts being made in a relatively short period of time, and after each addition allowing the yeast to propagate with aeration until substantially all the sugar has been assimilated prior to the addition of the fresh wort.

10. The manufacturing of yeast from sacchariferous material and yeast nourishing inorganic ammoniacal salts which comprises placing in a fermenter a yeast nutrient solution in an amount between 20% and 30% of the total fermenter volume, said nutrient solution containing sacchariferous material and inorganic ammoniacal salts, said salts being present from 50% to 100% of the weight of the sugar in the solution, said nutrient solution having a Balling so that the solution of the fermenter will be between 2.5° and 4° on the saccharometer, adding seed yeast to the solution in amounts at least equal to the weight of the sugar in the fermenter, aerating the solution, allowing the yeast to propagate until substantially all the sugar in the fermenter has been assimilated by the yeast, adding to the fermenter containing all of the first wort and the yeast produced therefrom a fresh wort which will fill up the fermenter from 35% to 60% of the fermenter volume and of such a concentration and amount that the resulting Balling of the fermenter is between 2.5° and 4° on the saccharometer and the amount of sugar added will be less than the amount of yeast in the fermenter, the addition of the total fresh wort being made in a relatively short period of time, allowing the yeast to propagate with aeration until substantially all of the sugar material has been assimilated by the yeast, adding another portion of the wort to the fermenter containing all of the previously added wort and the yeast produced therefrom to make up the fermenter volume, the addition of the total fresh wort being made in a relatively short period of time and of such a concentration and amount that the result Balling of the solution will be between 2½° and 4° on the saccharometer and the amount of sugar in the fermenter will be less than the amount of yeast present, and thereafter allowing the yeast to propagate with aeration until substantially all the sugar material has been assimilated by the yeast.

11. The manufacturing of yeast from sacchariferous material and yeast nourishing inorganic ammoniacal salts which comprises placing in a fermenter a wort containing sacchariferous material and yeast nourishing inorganic ammoniacal salts amounting to approximately 25% of the fermenter volume, said inorganic salts being present in amounts approximately equal to 72% of the sugar, the Balling of the solution being approximately 3° on the saccharometer, adding seed yeast to the fermenter in an approximate ratio of 1.3 parts of yeast by weight to 1 part of sugar in the fermenter, aerating the solution, allowing the yeast to propagate for approximately four hours, adding to the fermenter containing all of the first wort and the yeast produced therefrom a fresh wort which addition takes place in a relatively short period of time and makes the total volume up to approximately 56% of the fermenter volume, said additional portion of the wort being of such concentration that the resulting concentration in the fermenter will be approximately 3° on the saccharometer and the amount of yeast in the fermenter will be in an approximate ratio of 1.2 parts of yeast to 1 part of sugar added, allowing the yeast to propagate with aeration for a period of approximately five hours, adding to the fermenter containing all of the previously added wort and the yeast produced therefrom sufficient fresh wort to make up the fermenter volume, the addition of the total fresh wort being made in a relatively short period of time, the fresh wort being of such concentration that the resulting concentration in the fermenter will be approximately 3° Balling and the amount of yeast in the fermenter will be in the approximate ratio of 1.9 parts of yeast to 1 part of sugar added, and thereafter allowing the yeast to propagate with aeration until substantially all the sugar has been assimilated by the yeast.

12. The manufacturing of yeast which comprises placing in a fermenter a dilute yeast nutrient solution of an amount which does not fill up the fermenter, said nutrient solution containing sacchariferous material and other yeast nutrients, adding seed yeast to the solution in amounts at least equal to the weight of the sugar in the nutrient solution, aerating the solution, allowing the yeast to propagate until substantially all the sugar has been assimilated by the yeast, adding a second wort containing at least sacchariferous ous material to the fermenter containing all of the first wort and the yeast produced therefrom, the addition of the total of said second wort being made in a relatively short period of time, said second wort containing less sugar in weight than the weight of the yeast in the fermenter and greater in amount than the sugar originally added to the fermenter, and thereafter allowing the yeast to propagate with aeration until substantially all the sugar added in the second wort has been assimilated.

13. The manufacturing of yeast which comprises placing in a fermenter a dilute yeast nutrient solution of an amount which does not fill up the fermenter, said nutrient solution containing racchariferous material and other yeast nutrients, adding seed yeast to the solution in amounts at least equal to the weight of the sugar in the nutrient solution in the fermenter, aerating the solution, allowing the yeast to propagate until substantially all the sugar in the fermenter has been assimilated by the yeast, adding in successive steps at least two worts each containing at least sacchariferous material to the fermenter containing all of the previously added wort and the yeast produced therefrom, each additional wort being such that the weight of the yeast in the fermenter exceeds the weight of the sugar added and each containing sugar in amounts greater than the sugar added in the preceding additions, the addition of the total of each of the added worts being made in a relatively short period of time, and after each addition allowing the yeast to propagate with aeration until substantially all the sugar has been assimilated prior to the addition of another wort.

JOHN F. WROTEN.